United States Patent [19]

Goodrich et al.

[11] 4,317,980
[45] Mar. 2, 1982

[54] RESISTANCE WELDING SEQUENCE CYCLE CONTROL

[75] Inventors: Russell A. Goodrich, Grand Meadow; Larry H. Lengerman; James K. Timbeross, both of Rochester, all of Minn.

[73] Assignee: International Business Machines Corporation, Armonk, N.Y.

[21] Appl. No.: 109,021

[22] Filed: Jan. 2, 1980

[51] Int. Cl.³ .............................................. B23K 11/24
[52] U.S. Cl. ............................... 219/117.1; 219/86.41; 219/91.1; 219/108; 219/110
[58] Field of Search ...................... 219/108, 110, 117.1, 219/86.41, 91.1

[56] References Cited

U.S. PATENT DOCUMENTS

3,400,242 9/1968 Waller .................................. 219/110
4,024,371 5/1977 Drake ................................... 219/108
4,028,522 6/1977 Chihoski et al. ................. 219/117.1

*Primary Examiner*—C. C. Shaw
*Attorney, Agent, or Firm*—Robert W. Lahtinen

[57] ABSTRACT

A method and apparatus are shown for controlling the cycle of a resistance welding device by providing compensation for variations in the effective weld area and the primary input electric power variations through a composite correction applied to the length of the squeeze time cycle portion prior to the weld cycle portion when weld current is activated. Compensation is made for secondary weld current variations by altering the length of the hold cycle, during which electrode contact is maintained with the work subsequent to the weld cycle portion, to change the amount of heat quenched from the weld zone. Further by sensing the condition wherein either the electrical input or the motive power that drives the movable electrode is beyond correctable limits, the welding cycle is aborted when suitable quality welds cannot be made.

15 Claims, 6 Drawing Figures

RESISTANCE WELDING SEQUENCE CYCLE CONTROL

FIELD OF THE INVENTION

This invention pertains to welding and more particularly to a system and technique for controlling the resistance welding cycle to produce uniform welds.

BACKGROUND

A controlled resistance welding process should maintain the correct current density during the weld current flow time, the correct forge pressure established by the constriction of the work pieces between the opposed electrodes and proper quench cycle as the electrodes are maintained in contact with the work following the weld current cycle. Each of these factors are related to the secondary weld current.

The quality of work or parts produced by a resistance welding machine is dependent in part on maintaining a consistent level of various supply systems or making corrections within a range of acceptable values and on the interaction of various electromechanical devices during the machine's sequence cycle.

The part area in contact that can be joined during the welding operation is a function of the applied electrode force and the geometric form, size and hardness of the part weld projection relative to the weld current flowing to enable achievement of the correct current density. The standard equation is $I^2Rt$; however, to be a more accurate expression of the current density the relationship is expressed as $I^2Rt/A^2$, where I is the curret, R is the resistivity, t is the time and A is the weld area such as projection area in contact with the other work piece. It is a common practice in the art to seek control of the secondary weld current ($I^2$) and the duration of the weld current flow (t). To effectively control the overall welding cycle and weld quality it is also necessary to correct the contact area for the amount of weld current available or flowing or to adjust some welding cycle parameter to accommodate variations in the contact area.

SUMMARY OF THE INVENTION

In the system and method shown and described herein, the resistance welding cycle is controlled by making corrections during the cycle to correct for variations from the predetermined values with respect to both weld contact area and weld current. The system monitors not only the total weld cycle time, but also the various segments of the cycle which can serve as a diagnostic aid when compared to the times for cycle segments established for a normal cycle. The cycle is partitioned into delay, flight, squeeze, weld and hold times. The delay time is the period between the initiation of the command to start the cycle and the commencement of electrode movement. Flight time is the time required by the electrode to move from its initial position to a position in contact with the work. Squeeze time is the period between the initial contact with the work pieces and the commencement of the weld current flow cycle during which the electrode pressure between the electrodes and the work is built up and maintained prior to the application of weld current. The weld cycle, when referring to the cycle segment, is a period during which weld current is applied between the electrodes starting with the signal to start the weld cycle and terminating with the signal to start the hold cycle. The hold cycle is the time duration during which the electrodes are maintained in contact with the work subsequent to the weld cycle.

Same cycle control during the overall welding cycle as shown and described takes two forms. During the flight time the velocity of electrode travel is measured between two positions and the squeeze cycle is either lengthened, shortened or allowed to remain unchanged as a function of the sensed electrode velocity. Where electrode velocity is greater than a predetermined range of values the impact with the work will be greater than the impact for the normal range of cycle parameter values which would cause the weld area to increase, the squeeze time is shortened since the squeeze cycle also causes a progressively larger weld area to be created. Similarly, if the velocity sense is less than a predetermined range of values, the squeeze time is lengthened to cause the weld area established to increase during squeeze time to bring the contact area into an established range of values despite the reduced contact area created by the movable electrode impact with the work. If the sensed velocity is within an established range of values no correction is required or made. Also used to apply a correction to the squeeze time is the sensed magnitude of primary current. If the voltage at the primary is high, the secondary weld current will be increased which should be corrected by increasing the weld contact area. This is accomplished by lengthening the squeeze time. Likewise a low primary voltage indicates that a smaller secondary current will be available requiring a smaller weld contact area to maintain weld current density. Correction is effected by reducing the time duration of the squeeze cycle.

The second mode of same cycle control is to vary the duration of hold time as a function of the secondary current flow sensed. When a high value of weld current flow is sensed the hold cycle is extended. The increased current has resulted in greater heat generation in the weld region, and the increased hold cycle increases the quenching action to conduct heat from the weld region into the electrodes. In like manner, where a reduced value of secondary weld current is sensed, the duration of the hold cycle is shortened to reduce the quenching action and permit the weld region to cool more slowly.

In addition to the monitoring and control associated with the direct control of process parameters, the primary current conditions and the motive power used to move the electrode (commonly the air pressure in a pneumatic system) are monitored and compared to assure that the values are within a range that will allow good quality welds to be produced within the control capabilities of the controls that are exercised. If for example, the primary voltage or air pressure fall beyond the ability of the control techniques the cycle is aborted.

DETAILED DESCRIPTION

The process control technique contemplates a resistance welding system including the steps of closure of the electrodes upon the work piece, squeezing the work between the electrodes for a period prior to the weld current activation portion of the cycle, the weld current activation cycle portion and the hold cycle portion during which the electrodes are maintained in pressure contact with the work pieces prior to electrode reversal.

Figures 1, 2:
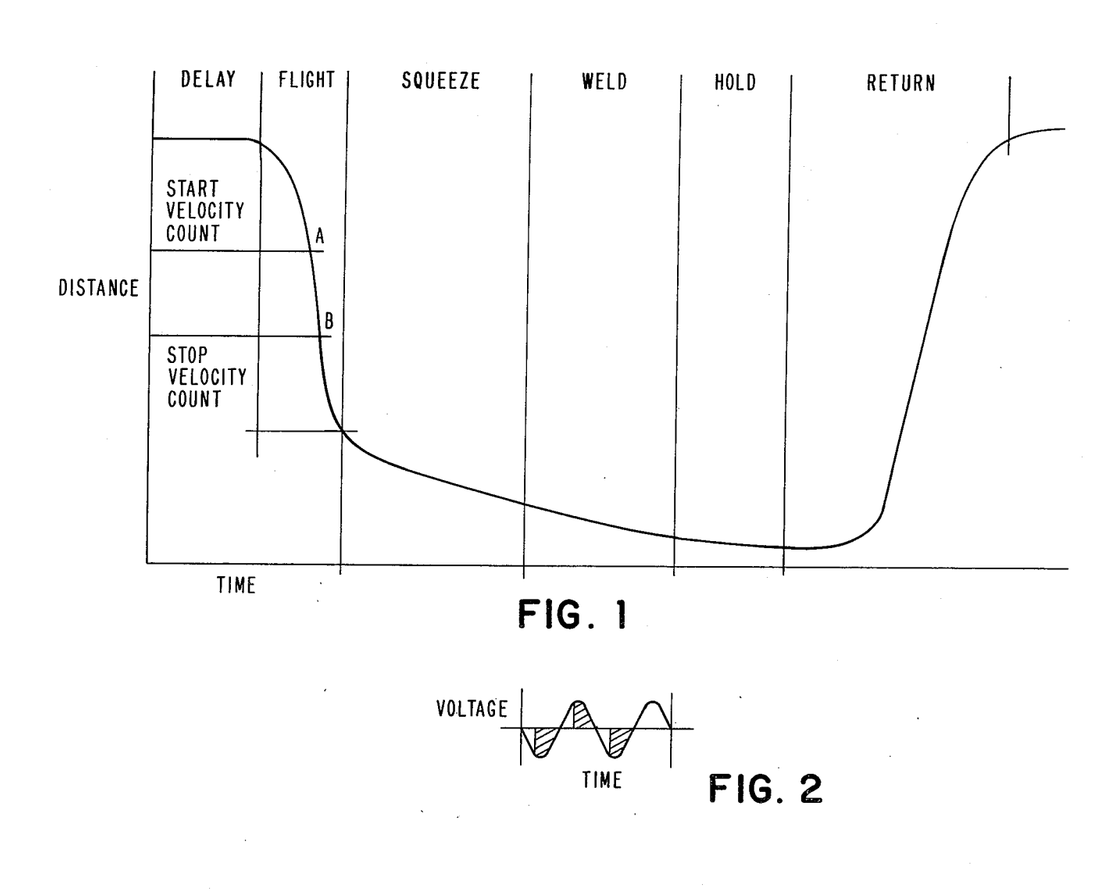
FIG. 1 is a graph of electrode movement versus time during a resistance welding cycle using the instant invention from the movable electrode's initial retracted position until the return to such retracted position.
FIG. 2 is a graph of voltage versus time during the weld cycle portion of the total weld cycle shown in FIG. 1.

Referring to FIG. 1, the cycle is graphically illustrated as a function of electrode movement versus time. At time zero the cycle is initiated by closing a manual switch (also subsequently identified as first state signal). The first time period denominated delay time is the elapsed time from switch actuation to initial movement of the movable electrode assembly which is a measure of the accumulated electrical and mechanical delay. The flight portion of the cycle is the time duration from the initial electrode movement to electrode contact with the work. Squeeze time is the period beginning with contact between electrode and work and terminating with the initiation of the cycle portion during which the weld current is activated. The weld portion is the subcycle during which weld current is activated, and hold is the cycle portion following the application of weld current during which electrode contact is maintained, terminating with electrode reversal. The overall electronic weld cycle terminates with the reversal of the electrodes, but the machine sequence cycle also includes the restoring of the movable electrode to the initial retracted position.

In the environment of the welder as shown, the cycle is started by actuating a manual switch. Flight time commences as a movement of the machine upper electrode is sensed. As seen in FIG. 4, electrode motion is ascertained by an optical position sensing device including a reader element 13 carried by the movable upper electrode assembly which cooperates with an optical scale 14 mounted on a stationary portion of the welding machine 15. As the electrode assembly 16 moves a train of signal pulses is generated, each pulse being indicative of an increment of movement. Flight time terminates when the output of the position sensing device indicates that a predetermined electrode location has been attained which has been established as the position at which the work is contacted. The squeeze cycle is a predetermined time period. The weld cycle includes one or more half cycles of alternating current flow during which current is initiated during each half cycle by a phase shift causing current to start at a given voltage threshold 20 (FIG. 3) and terminating as the voltage crosses zero. The current flow cycle and phase shift are illustrated in the graph of FIG. 2 showing voltage versus time during the weld cycle. The shaded portions represent the time and magnitude of current flow. In the environment shown the weld cycle is terminated and the hold cycle commences by sensing that there has been no weld current flow during the preceding 8 milliseconds. In effect this determines that no current flow has occurred during the last half cycle of 60 cycle current. The hold cycle is also a predetermined length of time at the end of which the hydraulic (pneumatic) valves are electrically actuated to retract the upper electrode. Actually electrode reversal is sensed by sensing the actuation of the valves that effect retraction of the electrode assembly.

Control of the welding cycle is effected by two principal corrections, one which is the composite of two increments of correction is related to the area of the weld surface interface and the other alters the electrode quenching action as a function of the weld current magnitude. During flight time, electrode velocity is determined between two established positions, identified in FIG. 1 as distances A and B. The time duration of travel between these electrode positions yields the velocity which is compared to an established value. A greater velocity will result in a greater impact force with the result that less squeeze cycle is required to attain the desired weld area. In this event the duration of the squeeze time is shortened to achieve the predetermined effective weld area. In a similar manner if a low velocity is sensed, the squeeze time is lengthened to compensate for the reduced effective weld area created by the impact of the movable upper electrode. A further increment of correction to the squeeze time is effected by sensing the primary winding voltage supply and compensating for variation from a normal value. A decrease in the sensed primary voltage indicates that the supply of secondary weld current during a weld cycle will be less than that established for the cycle. To provide compensation for such reduced weld current the weld area is reduced to maintain current density in the weld zone through the reduction of squeeze cycle time. Similarly a sensed voltage increase is accommodated by increasing the squeeze time to maintain weld current density. The sensed primary supply conditions give rise to varying results. If the values are within a first range or band close to normal, no corrective action is taken. If the sensed values fall within a second or third range or band of values either higher or lower than the first band wherein effective corrective action may be taken, the corresponding corrective factor is applied to the squeeze time count. If the sensed values fall outside the scope of the first, second and third bands indicating that the conditions cannot be corrected within the capability of the system another control overrides and aborts the weld cycle.

The second cycle parameter subject to corrective action to compensate for cycle parameter variations is the hold time. The system senses the secondary weld current which passes between the electrodes through the weld zone. This affords a secondary or "fine tuning" in response to the actual weld current flowing, following the prior correction based on the conditions of the electrical supply to the primary. If an increased current is sensed, the increased current density through the weld interface will increase the heat and resulting temperature. To compensate for this increase of temperature the hold cycle is extended to increase the quenching action and the heat removal from the weld zone affected by the electrodes. Likewise when a reduced secondary current is sensed, the hold cycle is shortened to reduce the quantity of heat quenched form the weld zone by intimate contact with the electrodes.

The welding system as described herein includes welding machine 15, a controller 22, and a welder interface monitor 24. The welding machine 15 is of conventional type with a fixed lower electrode assembly 25, a movable upper electrode assembly 16 and a pneumatic supply 26 for advancing and retracting the movable upper electrode assembly 16. The pneumatic system includes a pressure sensor 30 at the output of the compressed air supply 26 and branches to the ends of cylinder 32 for advancing and retracting the piston 33 and the movable upper electrode assembly 16 which are connected for common reciprocal motion. The branch to the upper side of the cylinder 32 includes in series, a pressure regulator 35, a pressure sensor 36, a valve 37 which also has an exhaust muffler 38 attached thereto, a pressure sensor 39 and a flow control valve 40. In like manner the branch leading to the lower end of cylinder 32 which operates to retract the piston 33 includes a pressure regulator 42, pressure sensor 43, valve 44 with an exhaust muffler 45 connected thereto, a pressure sensor 46 and a flow control value 47.

The welder includes a sequence controller 50 and a squeeze time control 53, a weld time control 54, and a hold time control 55. A bus 60 connected to sequence control 50 includes lines from pressure sensors 30, 36, 39, 43 and 46; pressure regulators 35 and 42; and valves 37 and 44. The primary weld current is supplied on lines 62 with a sensor 63 monitoring the value. The weld time controller 54 controls the number of half cycles used during the welding operation and the phase shift voltage value at which the current is turned on. The output weld current from the secondary coil 65 which passes through the work between upper electrode 67 and lower electrode 68 is monitored by a sensor 70. The squeeze time controller 53 terminates the squeeze cycle after a preset time which is subject to correction as to duration as a result of the sensed flight time velocity and sensed primary supply voltage. The correction is received from the controller 22 on line 71. The hold time controller 55 also functions to terminate the hold time after a predetermined period which is subject to a correction received from controller 22 on line 72 as a function of the secondary current condition sensed during the cycle.

The movable electrode assembly 16 position and velocity is determined optically by a reader element 13 carried by the electrode assembly and a stationary scale 14 mounted on the welder frame. The output from this electrode position sensor assembly is communicated to the interface monitor 24 on line 73.

The welder interface monitor 24 provides a series of counters which accumulate clock pulses and display the various cycle times and a series of switch elements that provide initial information or values to the system. Among the counters that are visually displayed on this device for monitoring and diagnostic purposes are the delay counter, the flight time counter, the flight distance counter, the squeeze time counter, the hold time counter and the return time counter, the total sequence cycle count and the number of weld cycles. Additionally displayed are informational matters such as secondary current amperes, secondary current flow time, primary amperes, primary voltage and a 24 hour master clock. The total machine sequence cycle count is effectively the sum of the delay, flight, squeeze, weld, hold and return count. The switch elements include manual switch devices for: resetting the master clock; entering the electrode position at which the work is contacted and the flight time count is terminated; business informational matters such as work assembly number, order number, engineering level, operator number, material specification and process and run date; and establishing the flight count start count and stop count distances for determining electrode velocity.

The welder interface monitor 24 exchanges both analog and digital signals with the welder and exchanges digital signals with controller 22. Controller 22 exchanges digital signals with the interface monitor 24 and transmits digital signals to the squeeze time controller 53, the hold time controller 55 and the sequence controller 50. The signals to the squeeze time controller 53 and hold time controller 55 are count corrections based respectively on the flight time velocity and primary current values. The controller also monitors the primary current and the system air pressure supply as seen by sensor 30. If either or both of these values are beyond the capability of the system control (usually when air pressure or current is too low to effectively perform the weld cycle) the controller 22 signals the welder on line 75 to abort the weld cycle and the sequence controller 50 terminates welder operation. The controller 22 also provides the interface and data communication with the input/output devices connected to the system such as a keyboard/display 77, tape storage device 78 or a printer 79.

Figure 3:
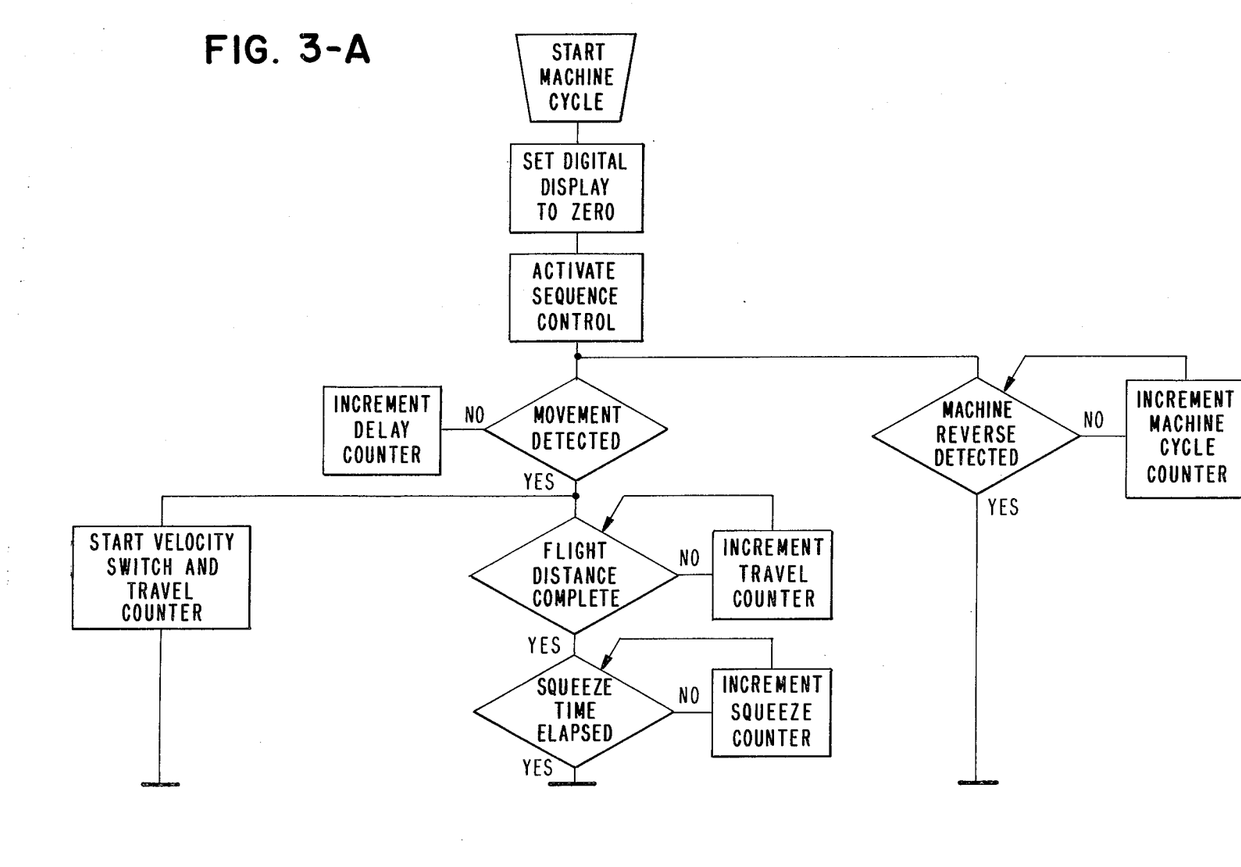
FIG. 3 is a flow chart showing the clock timing sequences.
Figure 4:
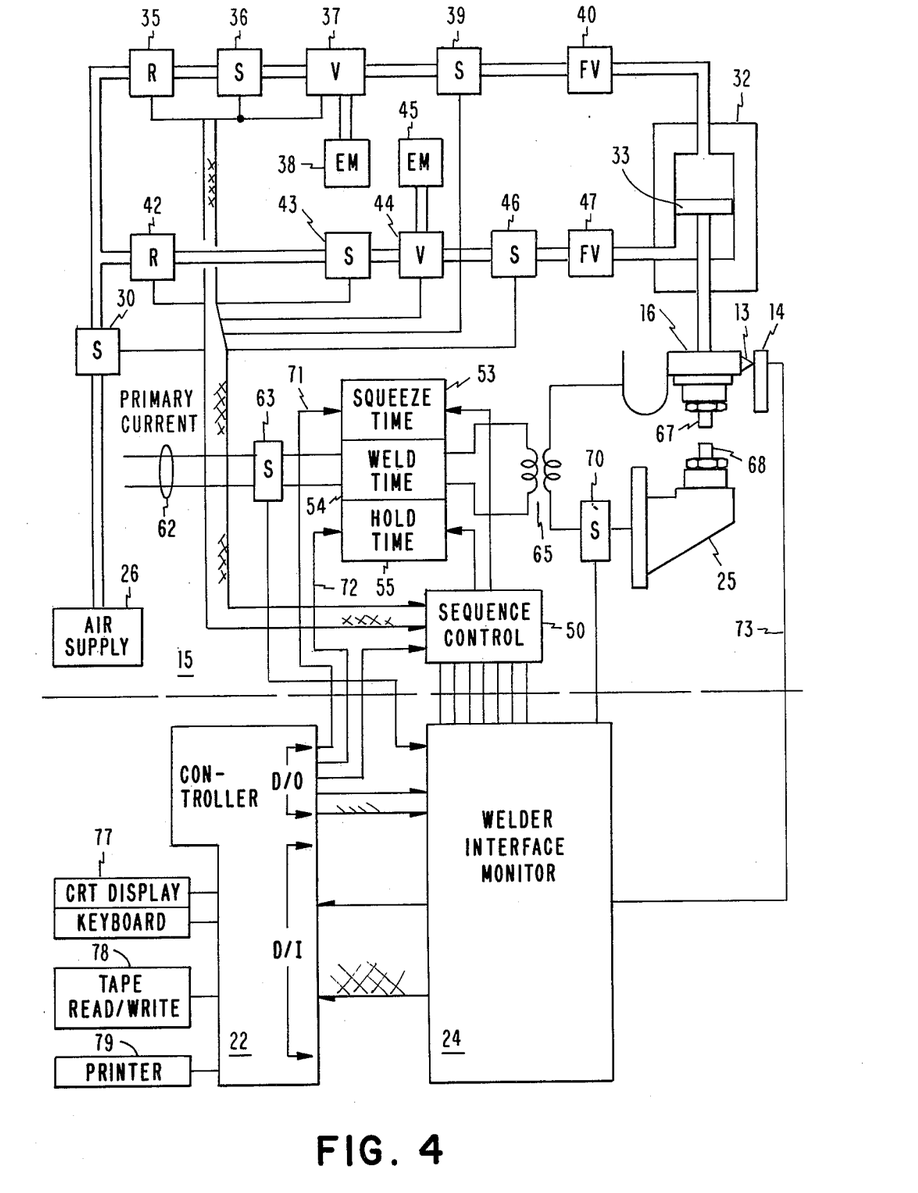
FIG. 4 is a schematic diagram of the welder, interface monitor and controller of the system and the various signal lines therebetween.

FIG. 3 illustrates the welding system sequence and the actuation of various monitoring counters. The welding system cycle is initiated by actuation of a manual switch that provides a first stage signal following which the system controls and corrects the cycle to exercise control until the weld is complete and the movable electrode restored to its initial position (or if air pressure and current variations indicate, the cycle is aborted). The display is set to zero and all counters reset and the sequence controller 50 activated. The machine cycle counter is activated and continues to keep a cumulative count until terminated by sensing a reversal of the movable electrode assembly 16. Simultaneously with the initiation of a machine cycle counter, the delay count is begun. When electrode movement is detected, the delay count is terminated and the travel or flight count is started. During flight time, beginning with a first electrode position and terminating when a second electrode position is attained, the velocity counter is incremented simultaneously with the travel or flight time counter to enable an electrode velocity determination to be made. When the movable electrode assembly 16 has achieved a predetermined downward position, the flight time or travel counter is degated and the squeeze cycle and incrementing of the squeeze counter commenced. When the squeeze counter reaches the predetermined value (or the value as corrected as a function of the electrode velocity and primary voltage), the squeeze cycle portion is ended and the weld cycle portion is started. When the weld current is detected, the voltage peak detector is turned on and incrementing of the weld counter continued. The weld counter is continually incremented until there has been no flow of weld current for 8 milliseconds. When this occurs the weld cycle portion is terminated and the hold cycle begun. The hold cycle is also a predetermined time value as corrected as a function of the secondary current sensed. When machine reverse is detected both the hold cycle count and the overall machine (electronic) cycle count are terminated. The time required for the movable electrode to return from the position of detected electrode reversal at the end of the hold cycle portion to the initial retracted position is also counted and recorded on a visual counter for monitoring purposes. This return time is part of the total machine sequence time, but does not form a portion of the overall weld cycle. When the machine cycle is complete all counters and detectors are displayed and held until reset by the initiation of a subsequent cycle to provide for monitoring the machine cycle and diagnostic purposes.

Figure 5:
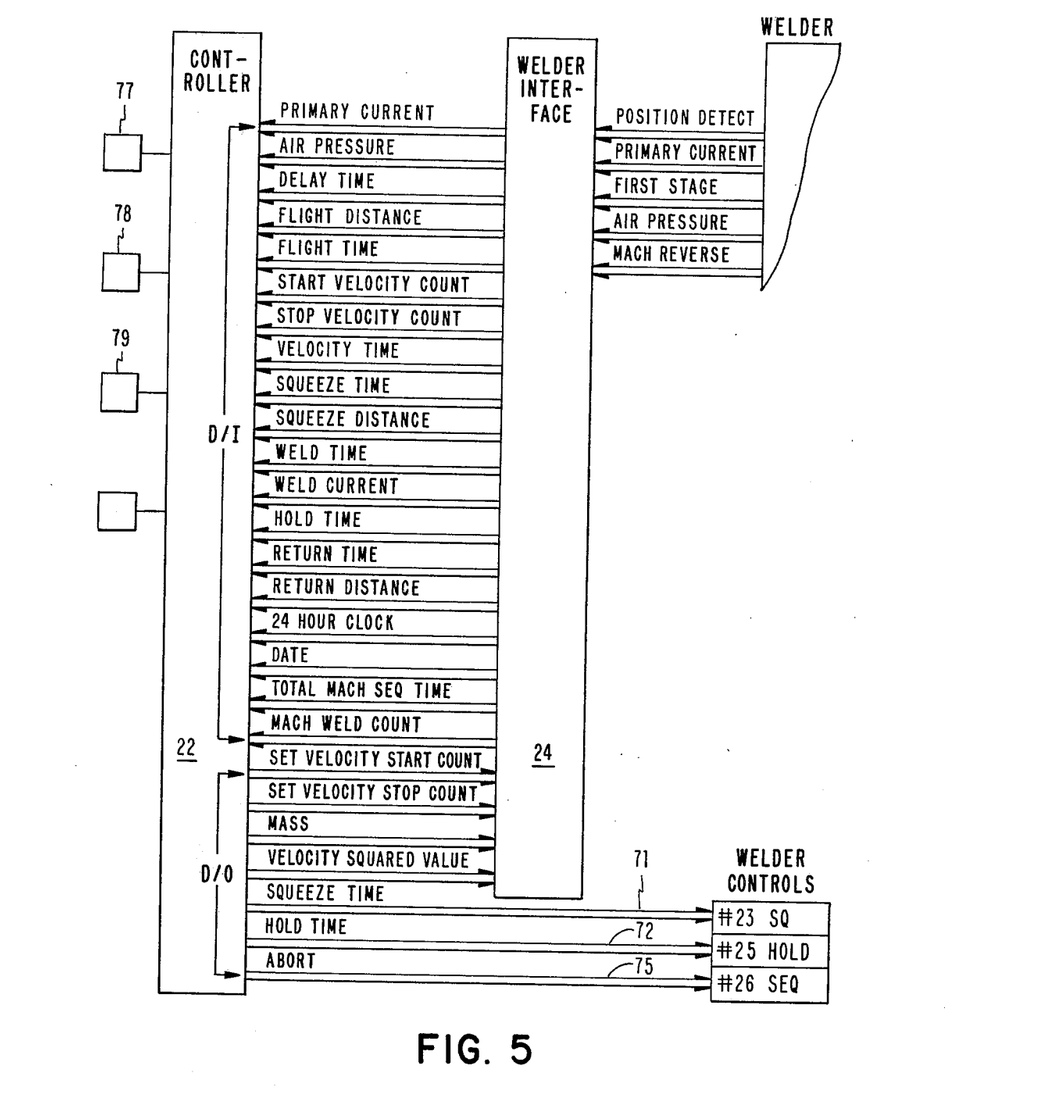
FIG. 5 is a more detailed showing the control signal and signals interchanged between the interface monitor and controller.

FIG. 5 illustrates the various signals interchanged between controller 22 and welder interface monitor 24; signals received by welder interface monitor 24 from the welding machine 15 and the digital output command from the controller to the welder controls. The delay time, flight time, velocity time, squeeze time, weld time, hold time and return time are clock counts giving the elapsed time of each of these welding cycle subportions which are recorded and displayed by the welder interface monitor 24. Total machine sequence time is the total clock time for a weld cycle including the delay, squeeze, weld and hold time while machine weld count is a count of a number of welding cycles by the machine effected by recording the number of weld cycles during which weld current flows. Such signals as primary current, air pressure and weld current are sensed values while flight distance, return distance, start velocity count and stop velocity count represent preset values. The digital output signals to squeeze time control 53, hold time control 55 and sequence controller 50 are the signals that effect control of the squeeze or hold times or abort the weld cycle in accordance with the parameters sensed.

It is commonplace to control the weld current of a resistance welding cycle. However, since the heat required to effect a good quality weld is affected even more by variations in the contact area of the weld, it is of even greater importance to exercise control of the weld cycle based upon variation of the contact area than variation of the weld current. Since the relationship is $I^2 t/A^2$ where I is the RMS amperes, t is time and A is the weld contact area, the impact of area variation exceeds the effect of current variation. Good practice would indicate control of the weld cycle based upon sensed variations in both weld current and weld contact area.

The technique of the welding control system described herein is to compensate for primary current variation by increasing or diminishing the quenching action through respectively lengthening or shortening the hold cycle and compensating for increases or decreases of the weld area as a result of electrode velocity by respectively decreasing or increasing the squeeze time to bring the weld area to the predetermined value.

It would also be possible to compensate for material hardness variations which would also affect the weld area. To provide such control the squeeze distance digital input signal to controller 22 is compared to a predetermined value. The squeeze distance is the electrode travel during squeeze time. A greater squeeze distance, indicates that the material encountered was softer, and a greater weld area is generated while a lesser distance is indicative of harder material and a reduced weld area. This sensed variation can be controlled by imparting a further incremental correction to the hold time correction, decreasing the hold time or the correction when a greater area is sensed and increasing the hold time or correction thereof when a reduced area is sensed.

In an example of operational control utilized during the welding of 0.050 to 0.060 inch low carbon steel, the various empirically determined or reference values are preset or established during an initial machine cycle of operation. The flight distance is known and set; the squeeze time, hold time and the number of half cycles during which weld current flows and the phase shift associated with each is set. In the following description the references to cycles as a measure of time are the time duration of one cycle of 60 HZ single phase current or about 16.6 ms per cycle.

Typically the air pressure deviation will only cause the cycle to be aborted if the air pressure falls to a value too low to permit the various cycle portions or any of them to be carried out. Normally the flow control valves 40, 47 and the pressure regulator valves 35, 42 (FIG. 4) will preclude application of an excessively high pressure. For example, when the system pressure from supply 26 is 90 to 100 psi, the regulated operating pressure may be in the range of 40 psi or lower. An excessively reduced pressure will prevent proper operation of the welding machine during the squeeze, weld and hold cycle portions irrespective of any correction indicated or attempted.

Upon activation of the first stage switch valves 37 and 44 are energized. The electrodes normally are open with electrode 67 in the retracted position, valve 44 open and valve 37 closed. First stage switch actuation causes valve 37 to open, valve 44 to close and the delay time count to begin. When the air pressure on the top of piston 33 and the weight of the electrode assembly 16 overcome the falling pneumatic pressure on the lower surface of piston 33 the electrode assembly starts to move downward. As movement is detected on scale 14 the delay time is terminated, and the flight time count is begun.

Between two physical positions of the movable electrode assembly the oscillator count is also accumulated by a velocity counter with the total count being converted to an electrode velocity. The electrode velocity is compared to the velocity recorded during the initial cycle. If the deviation from the reference velocity is below 10%, either faster or slower, no corrective action is taken. If the deviation from the reference is from 10% to 20%, either faster or slower, a correction is applied to the squeeze cycle. The correction is the same percentage alteration of the squeeze cycle as the percentage deviation of the sensed velocity from the reference velocity. If the squeeze cycle is 20 cycles of time in length, then a sensed deviation from the reference which is a 15% higher electrode velocity, a 15% or 3 cycle time correction is subtracted from the squeeze cycle portion. Likewise a sensed velocity 15% slower than the reference would result in a 15% or 3 cycle time increase in the squeeze cycle portion. The correction is calculated to the nearest cycle time. Should the sensed velocity differ by an amount in excess of 20% the total machine cycle is aborted and operation of the welder terminated.

Prior to the beginning of squeeze time the primary voltage is sensed and compared to the primary voltage sensed during the initial cycle which produced a good weld. If the primary voltage varies no more than 10% either greater or less than the reference valve, no corrective action is taken. If the primary voltage exceeds or falls below the reference value by more than 10% but no more than 20% a correction is applied to the length of the squeeze time cycle portion. If the deviation of the primary voltage from the reference exceeds 20% the machine operation cycle is aborted and the machine operation terminated. Within the range of correction (primary voltage being 10 to 20% high or low), the squeeze cycle is corrected by extending or shortening the squeeze cycle by one half the percentage change that the primary voltage deviates from the reference voltage. This correction is also calculated to the nearest cycle of time. Accordingly, if the primary voltage were sensed to be 18% low as compared to the reference monitored during the initial cycle, a 9% reduction in the 20 cycle squeeze time is applied or a reduction of 2 cycle times to the nearest cycle. Similarly, if the primary voltage were sensed to be 18% higher than the reference, the squeeze time would be lengthened by 2 cycle times to increase the area to be welded and thereby achieve a more constant weld current density.

The squeeze cycle would typically include 5 cycles of time during which the electrode "rings in" as travel is halted and electrode pressure is established. Thereafter the squeeze cycle is continued for an additional 15 cycles. Prior to the start of the squeeze cycle the corrections to be applied (if any) are determined and the algebraic sum of the cycles to be added or subtracted from the squeeze cycle are applied to the length as a composite correction.

As described above, the machine weld cycle can be aborted by an out of range condition of either primary voltage or pneumatic pressure until the termination of the squeeze cycle. However, once the weld cycle portion is initiated the machine operation cycle is committed to go to completion and is no longer subject to the abort control.

At the conclusion of the squeeze cycle, the weld cycle portion commences. During the first cycle time, the controller picks up the timing. Thereafter the preset number of half cycles occur during which weld current is activated in accordance with a preset phase shift timing within each half cycle. The weld cycle portion is terminated when 8 ms have transpired without current flow. During the current activation portion of the weld cycle the secondary RMS amperes or weld current is sensed. If the sensed current varies within 3% of the weld current reference value, no corrective action is taken. If the weld current exceeds 3% deviation above or below the reference value a correction is applied to the hold time. If the sensed value exceeds the reference value by an amount which requires a correction the hold time is lengthened to quench or remove heat from the weld zone and if the sensed value is less than the reference by a magnitude that requires a correction, the hold cycle is shortened to reduce the quantity of heat removed from the weld zone.

In the present example, the typical hold time would be twice the weld time. The weld time using three half cycles during which weld current is activated, the initial single cycle and the final half cycle without weld current activation would be a total of three cycles. The corresponding hold cycle portion would be six cycles of time. If the weld current sensed deviates from the reference by more than 3% a correction is applied to the hold time cycle portion of 25% of such hold time for each percent deviation in excess of three (to the nearest cycle time). If the weld current exceeds the reference value weld current, the hold cycle is lengthened and if the sensed weld current is of lesser magnitude than the reference the hold cycle portion is shortened. Thus if a deviation of 5% is sensed wherein the reference current is exceeded, the hold time is lengthened by 50% or 3 cycles of time. Since this is a secondary or fine timing of the weld current, a large percentage deviation is not anticipated. Should the deviation be greater than 6% from the reference value the correction will be applied, but the controller will also print a message indicating a deviation and the magnitude thereof.

In addition to the control exercised above which regulates the duration of the squeeze and hold cycles, the system also senses and identifies the longer term trends in machine primary voltage input. If the primary supply voltage has made a trend shift beyond the pre-established control limits, over a period of time, the machine is stopped and the reason for the shut down printed out. The phase shift and/or the number of weld current cycles, and/or the transformer tap, are altered to establish a new reference and avoid frequent error conditions or the functioning of the machine at the fringe of the control band.

While the invention has been particularly shown and described with reference to a preferred embodiment thereof, it will be understood by those skilled in the art that the foregoing and other changes in form and detail may be made therein without departing from the spirit and scope of the invention.

Having thus described the invention, what is claimed as new, and desired secured by Letters Patent is:

1. The method of controlling the cycle of operation of a resistance welding device which includes a movable electrode assembly and a cycle of operation having a flight cycle portion during which the movable electrode assembly is advanced toward the work by a motive means, a squeeze cycle portion during which electrodes are maintained in pressure contact with the work, a weld cycle portion during which weld current is activated and a hold cycle portion during which pressure contact between electrodes and work is maintained subsequent to the activation of weld current comprising the steps of:
   sensing the velocity of said movable electrode assembly during said flight cycle portion,
   comparing the sensed velocity to a predetermined velocity value, and
   altering the length of the squeeze cycle portion as a function of the comparison of said sensed velocity to said predetermined velocity value.

2. The method of claim 1 wherein the step of altering the length of said squeeze cycle portion comprises shortening the duration of said squeeze cycle portion when said sensed velocity exceeds said predetermined velocity value and lengthening the duration of said squeeze cycle when said sensed velocity is less than said predetermined velocity value.

3. The method of claim 2 wherein said predetermined velocity value includes a band of values and the step of altering the length of said squeeze cycle portion comprises making no change in the duration of said squeeze cycle portion if said sensed velocity is within said band of values.

4. The method of claim 3 further comprising:
   sensing the primary voltage input of the resistance welding device,
   comparing the sensed voltage to a predetermined voltage value, and
   altering the length of said squeeze cycle portion as a function of the comparison of said sensed voltage with said predetermined voltage whereby the altered length of said squeeze cycle portion is the composite correction arising from the said sensed velocity and the said sensed primary voltage.

5. The method of claim 4 wherein the altering of the length of the squeeze cycle as a function of sensed primary voltage comprises lengthening said squeeze cycle when the sensed primary voltage exceeds said predetermined voltage value and shortening said squeeze cycle when said sensed primary voltage is less than said predetermined voltage value.

6. The method of claim 5 further comprising:
sensing secondary weld current flowing during said weld cycle portion,
comparing said sensed weld current to a predetermined weld current value, and
altering the duration of said hold cycle portion by lengthening the duration thereof when said sensed weld current exceeds said predetermined weld current value and shortening the duration thereof when said sensed weld current is less than said predetermined weld current value.

7. The method of claim 6 wherein said predetermined weld current value comprises a range of current magnitudes and a sensed weld current falling within such range of magnitudes results in a zero correction and no alteration of the hold cycle portion length.

8. The method of claim 7 further comprising:
comparing said primary voltage input to a preset first high value and a present second low value prior to said weld cycle portion, and
terminating the welding device cycle of operation if said primary voltage exceeds said first value or falls below said second value.

9. The method of controlling the resistance welding cycle of a resistance welding device having a movable electrode assembly and including device welding cycle operation with a flight time
cycle portion during which the movable electrode assembly closes to a position of contact with the work, a squeeze time portion during which electrode pressure contact is maintained with the work prior to a weld cycle portion during which weld current is activated comprising:
sensing electrode assembly velocity during said flight time cycle portion;
comparing said velocity to a predetermined velocity value;
sensing the welding device input power supply voltage;
comparing said sensed voltage with a predetermined voltage value;
altering the length of said squeeze time cycle portion by a composite correction which is the sum of the corrections resulting from said velocity comparison and said voltage comparison, whereby the effective weld contact area is corrected to effect a proper weld current density.

10. The method of claim 9 wherein said welding cycle further includes a hold cycle portion wherein electrode contact pressure is maintained with the work subsequent to the weld cycle portion and further comprising the steps of:
sensing secondary weld current during said weld cycle portion;
comparing said sensed current value to a predetermined current value; and
altering the hold cycle portion time duration as a function of any deviation found during said current comparison whereby the temperature of the weld zone immediately after the weld cycle portion is maintained by greater electrode quenching action when a greater current is sensed and by lesser electrode quenching action when a lesser current has been sensed.

11. The method of claim 10 wherein the device electrode assembly is advanced and maintained in pressure contact by fluid pressure comprising the further steps of:
sensing the device fluid pressure and comparing said sensed fluid pressure to a threshold value;
comparing said sensed power supply voltage to a threshold value; and
aborting said resistance welding cycle if one of said sensed fluid pressure and said sensed power supply voltage fall below the compared threshold value.

12. In combination with a resistance welding device including a transformer power supply and a movable electrode assembly which has a cycle of operation includng a flight time portion during which the movable electrode assembly moves from a retracted position to a position of contact with the work, a squeeze time portion during which the electrodes are retained in pressure contact with the work prior to weld current activation, a weld cycle portion during which weld current is activated and a hold cycle during which the electrodes are maintained in contact with the work subsequent to the weld cycle portion;
controller means;
first sensing means connected to said controller means for sensing movable electrode assembly velocity during said flight time portion; and
first adjusting means for adjusting the time duration of said squeeze time portion as a function of the output of said first sensing means.

13. The combination of claim 12 further comprising:
second sensing means connected to said controller means for sensing transformer secondary current during said weld cycle portion, and
second adjusting means for varying the length of said hold cycle as a function of the output of said second sensing means.

14. The combination of claim 13 further comprising:
third sensing means connected to said controller means for sensing transformer primary voltage, and
wherein said first adjusting means is also connected to said third sensing means to effect a composite alteration of the duration of said squeeze time portion as a function of the outputs of said first sensing means and said third sensing means.

15. The combination of claim 14 wherein said electrode assembly is driven by fluid actuating means, further comprising:
fourth sensing means connected to said controller means for sensing the fluid pressure of said fluid actuating means, and
cycle interrupt means for disabling said resistance welding device when the value sensed by one of said third and fourth sensing means is not within a predetermined range of values respectively established for said primary voltage and said fluid pressure.

* * * * *